United States Patent [19]

Kim

[11] Patent Number: 5,762,412
[45] Date of Patent: Jun. 9, 1998

[54] PANEL OPENING AND CLOSING APPARATUS

[75] Inventor: Seung-Seob Kim, Kyunggi-Do, Rep. of Korea

[73] Assignee: Daewoo Electronics Co., Ltd., Seoul, Rep. of Korea

[21] Appl. No.: 751,939

[22] Filed: Nov. 19, 1996

[30] Foreign Application Priority Data

Dec. 28, 1995 [KR] Rep. of Korea ............ 95-60829

[51] Int. Cl.$^6$ ............................................. A47B 96/00
[52] U.S. Cl. ................... 312/319.2; 312/328; 312/327
[58] Field of Search ......................... 312/328, 327, 312/319.2

[56] References Cited

U.S. PATENT DOCUMENTS

| | | | |
|---|---|---|---|
| 2,215,626 | 9/1940 | Visser | 312/328 X |
| 2,296,950 | 9/1942 | Roedl | 312/319.2 X |
| 2,338,477 | 1/1944 | Wolters et al. | 312/319.2 X |
| 2,550,158 | 4/1951 | McCormick | 312/327 X |
| 3,264,050 | 8/1966 | Porter | 312/325 |
| 4,346,950 | 8/1982 | Ueno et al. | 312/325 X |
| 4,468,836 | 9/1984 | Omata | 16/82 |
| 4,550,470 | 11/1985 | Omata | 16/85 |
| 4,830,151 | 5/1989 | Numata | 16/82 |
| 4,986,618 | 1/1991 | Wakatsuki | 312/328 X |
| 5,239,427 | 8/1993 | Ooka et al. | 360/71 |
| 5,240,319 | 8/1993 | Koga | 312/319.2 |
| 5,324,105 | 6/1994 | Christensen | 312/327 X |
| 5,593,203 | 1/1997 | Abbott | 312/327 X |

FOREIGN PATENT DOCUMENTS

| | | | |
|---|---|---|---|
| 752751 | 2/1967 | Canada | 312/327 |
| 9713 | 5/1908 | United Kingdom | 312/327 |

*Primary Examiner*—Peter M. Cuomo
*Assistant Examiner*—David E. Allred
*Attorney, Agent, or Firm*—Beveridge, DeGrandi, Weilacher & Young LLP

[57] ABSTRACT

A panel opening and closing apparatus comprises a panel part having a rotating axis protruding from a lower part of both sides of the panel part to be opened and closed by rotating the panel part and connected by the rotating axis at a lower part of both sides of a main body. An elastic pressing part is installed in an inner side of the main body to press against the panel part toward an outside of the main body by a force of restoration. A locking part is installed in the inside of the main body and prevents the panel part from being rotated and opened by using the elastic pressing part because of grasping the panel part. A damping part comprises a force converting member for changing a rotary movement of the panel part to a rectilinear movement to be rotated by the panel part at low speed, a sliding member slid toward one of the forward and backward directions of the main body according to the movement of the force converting member, and a damping member in contact with the bottom face of the sliding member for reducing the sliding speed.

6 Claims, 4 Drawing Sheets

PANEL OPENING AND CLOSING APPARATUS

BACKGROUND OF THE INVENTION

1. Field of the Invention

The present invention relates to a panel opening and closing apparatus, particularly to a panel opening and closing apparatus that is capable of opening and closing the panel by rotating the panel installed in the front side of the main body for inserting and ejecting a tape in a car audio device.

2. Description of the Prior Art

Recently developed audio devices are generally compact. Especially, audio devices installed in a car or the like must be compact and thin due to the space limitations. The panel installed in the front side of the audio device comprises an LCD to display information about the operation of the audio device, function knobs to indicate the operation, a tape slot, and the like. Therefore, a construction of the front side of the audio device which is compact and thin is compatible. Thus, an audio device in which the tape slot is removed from the front side of the main body of the audio device has been proposed. The audio device in which the tape slot is removed comprises the panel opening and closing device for inserting and ejecting the tape.

FIG. 1 shows a conventional panel opening and closing apparatus to open and close the panel with a motor.

When an ejecting knob installed in a panel assembly 20 is pressed, a motor 60 is driven to provide a driving force to separate panel assembly 20 from an escutcheon 40. A worm 62 transmits a turning force of motor 60 to a driving motor 72 in a speed reducing gear part 70. Driving gear 72 is connected to a connecting gear 74 and a passive gear 76 in that order. The reduced turning force is transmitted to a driving link 80 connected with passive gear 76.

One side of driving link 80 is connected to one side of passive gear 76 for transmitting the driving force with reduced speed to panel assembly 20. The other side of driving link 80 is connected to an operating link 82 for separating an upper part of panel assembly 20 from escutcheon 40. Thus, driving link 80 moves along with a circular locus by rotating passive gear 76. Operating link 82 having one side thereof fixed with panel assembly 20 moves in a horizontal direction according to the movement of driving link 80.

According to the horizontal movement of operating link 82, a lower part of panel assembly 20 is pushed toward the front side of the main body. A slide guide 24 movably installed in an upper part of one side of panel assembly 20 moves downward along with a guide groove 44 formed in escutcheon 40.

That is, the lower part of panel assembly 20 moves in a horizontal direction according to the horizontal movement of operation link 82. Slide guide 24 installed in the upper part of panel assembly 20 vertically moves downward along with guide groove 44 formed in escutcheon 40. Consequently, panel assembly 20 is opened.

However, the conventional panel opening and closing apparatus for the audio as described above is complicated due to its construction having a motor and several speed reduction gears in order to provide a driving force for opening and closing the panel. Also, the rotation of the motor makes a noise during the panel opening and closing.

SUMMARY OF THE INVENTION

Therefore, it is an object of the present invention to provide a panel opening and closing apparatus having a simplified construction being capable of opening and closing the panel with a simple mechanism.

To accomplish the above object of the present invention, the present invention provides a panel opening and closing apparatus for inserting and ejecting an information recording medium comprising:

a panel part having a rotating axis protruding from a lower part of both sides of the panel part to be opened and closed by rotating the panel part and connected by the rotating axis at a lower part of both sides of a main body for opening and closing an opening defined in a front side of the main body;

an opening and closing part installed in an inner part of the main body inwardly of the opening and having an elastic pressing part for turning the panel part on the rotating axis by pressing the panel part toward the outer direction outwardly of the opening of the main body and opening the panel part and a locking part for grasping the panel part to prevent the panel part from being rotated and opened by the elastic pressing part; and a damping part for rotating the panel part at low speed having a force converting member with one edge thereof connected with the panel part to change a rotary movement of the panel part into a rectilinear movement, a sliding member being capable of sliding toward one of the forward and backward directions of the main body according to the movement of the force converting member, a damping member in contact with a bottom face of the sliding member for reducing a sliding speed of the sliding member, and a supporting member fixed at the bottom face of the inner part of the main body for supporting the damping member.

The locking part is formed as a hook in order to hook in the panel part, so that the panel part remains in the closed condition by preventing a rotation of panel part by the elastic pressing part.

The panel part comprises a protrusion formed in a corresponding position with the locking part and remains in the closed condition without rotation of the panel part by using the elastic pressing part because of being hooked to the protrusion in the locking part.

The sliding member comprises a sliding rack having a groove horizontally extended to put a guiding part installed at the side face of the supporting member and allowing the sliding member to be guided in the horizontal direction according to the movement of the force converting part.

According to the panel opening and closing apparatus according to the present invention, the locking part is connected with the protrusion formed in the panel part, and the elastic pressing part for pressing the panel in the outer direction of the main body by the force of restoration is installed in the inner face of the panel part, so the panel part automatically opens by the unlocking operation of the locking part and the protrusion and is closed by the pushing of the panel part and resulting in the rotation of the panel. Thus, the panel opening and closing operation is achieved by a simple mechanism.

Also, according to the panel opening and closing apparatus according to the present invention, the damping part reduces the rotational speed of the panel part by the force converting member that changes the rotary movement of the panel part to the rectilinear movement, the slide member to be slid in the horizontal direction according to the movement of the force converting member, and the damping member to make contact with the bottom face of the sliding member. Thus, the panel part softly opens and closes, and noise generation is prevented during the panel opening and closing.

BRIEF DESCRIPTION OF THE DRAWINGS

The characteristics and virtues of the present invention will become more apparent by describing in detail a preferred embodiment with reference to the attached drawings in which.

DETAILED DESCRIPTION OF THE PREFERRED EMBODIMENT

With respect to the panel opening and closing apparatus according to the present invention, it will be described in the following description with reference to the drawings, FIGS. 2 to 4.

Figure 1:
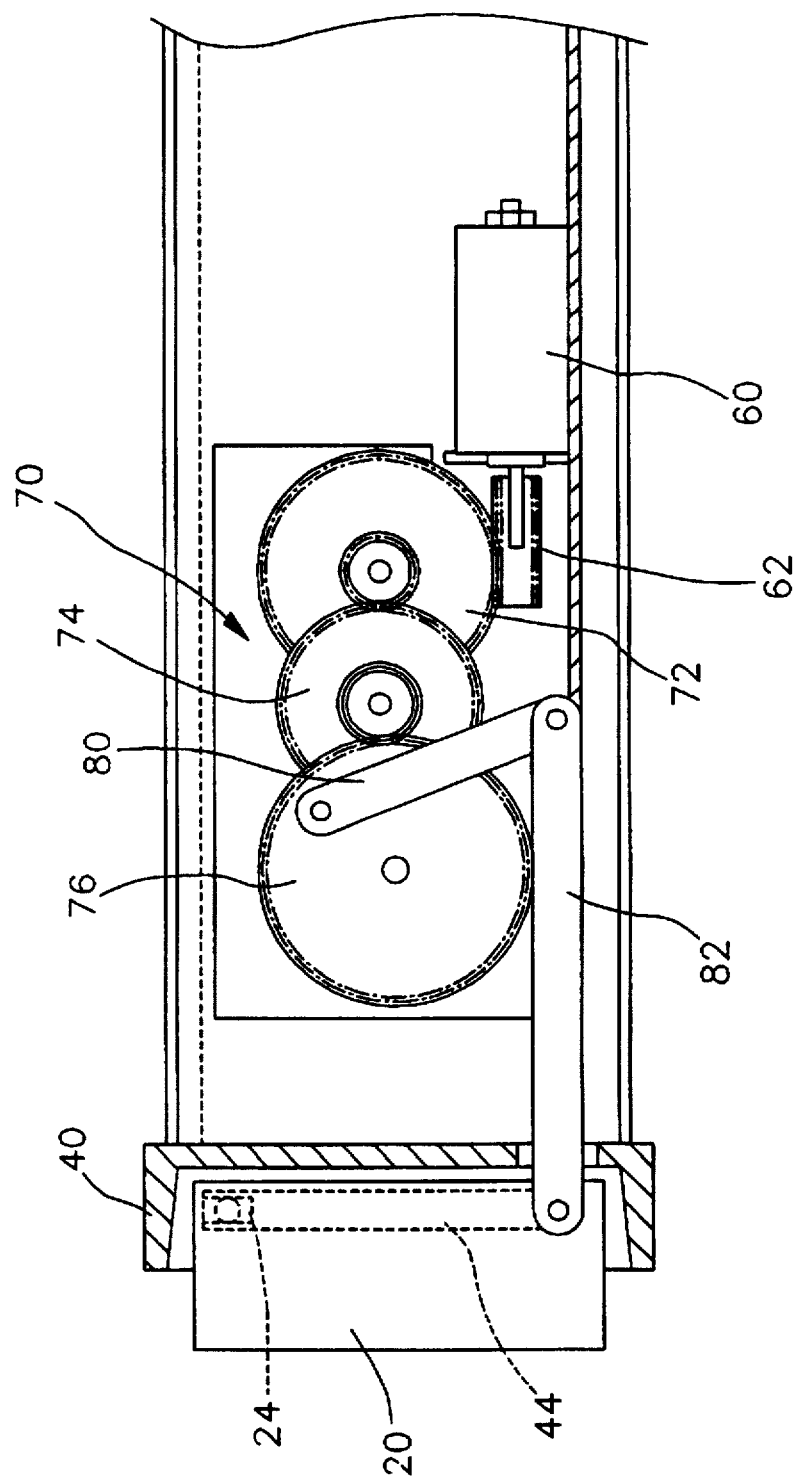
FIG. 1 shows a conventional panel opening and closing apparatus.
Figure 2:
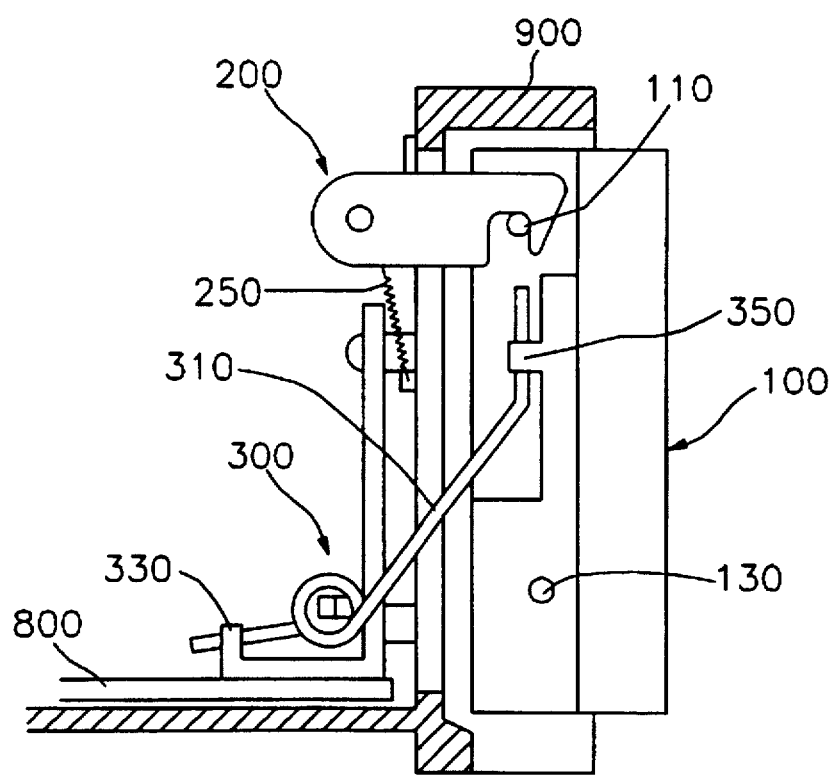
FIG. 2 shows a panel part and an opening and closing part of the panel opening and closing apparatus according to the present invention.
Figure 3:
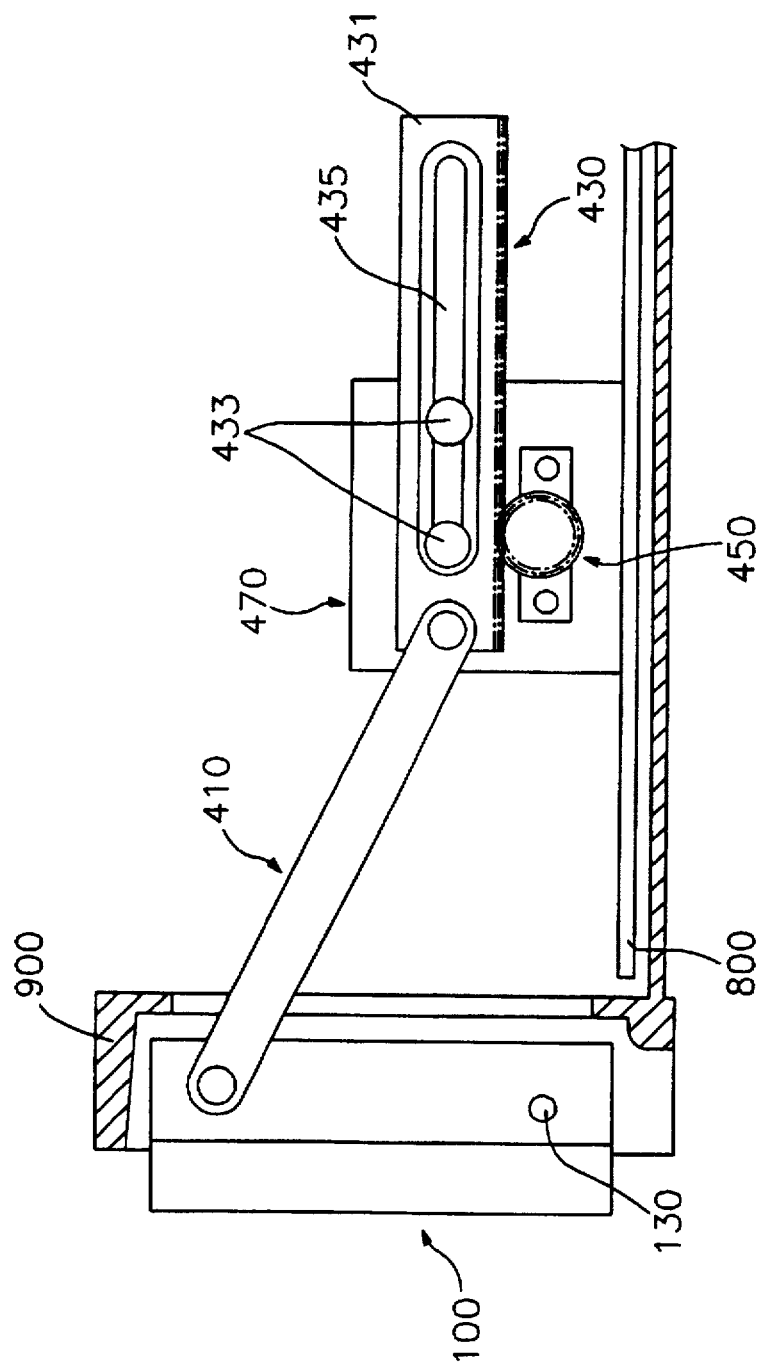
FIG. 3 shows a damping part of the panel opening and closing apparatus according to the present invention.
Figure 4:
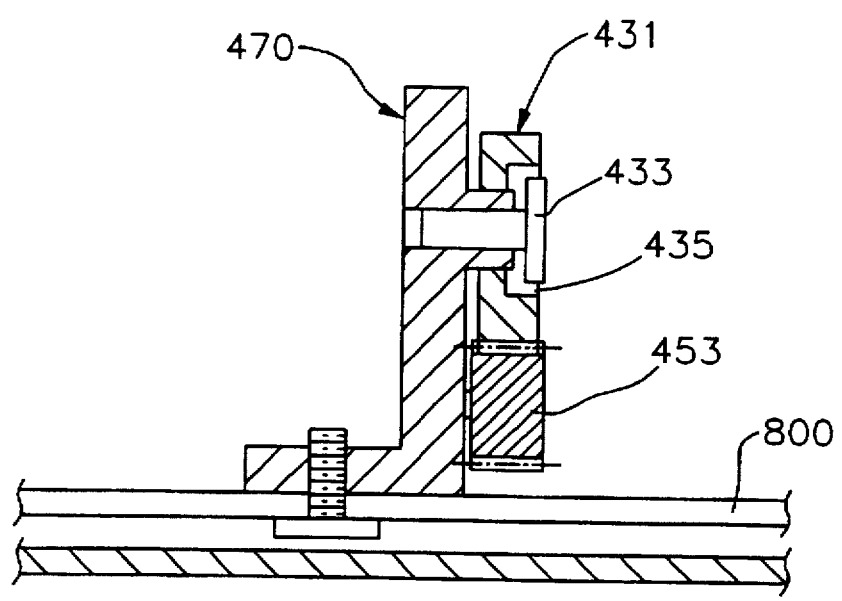
FIG. 4 is a side view of the damping part of the panel opening and closing apparatus according to the present invention.

FIG. 2 shows a panel part and an opening and closing part of a panel opening and closing apparatus according to the present invention, and FIGS. 3 and 4 show a damping part of a panel opening and closing apparatus according to the present invention.

A panel part 100 has a rotating axis 130 in the lower part of both sides thereof. Rotating axis 130 of panel part 100 is connected in a predetermined position in the lower part of both sides of a main body 900 for inserting and ejecting the information recording medium.

An opening and closing part for opening and closing panel part 100 is installed in an inner part of main body 900 for turning panel part 100 on rotating axis 130, and comprises an elastic pressing part 300 for pressing panel part 100 in the opened condition by the force of restoration.

Elastic pressing part 300 is a coil spring 310 that has one side held on a first fixing part 330 installed in an upper face of a PCB 800 fixed at a bottom face of main body 900 and the other side held on a second fixing part 350 formed in an inner face of panel part 100 for pressing panel part 100 toward the outer direction of main body 900.

When panel part 100 is closed, a locking part 200 grasps panel part 100 to prevent panel part 100 from being rotated and opened by elastic pressing part 300. Locking part 200 is formed as a hook and prevents the rotation of panel part 100 by hooking on panel part 100, and thus maintains panel part 100 in a closed condition. A protrusion 110 is formed in a predetermined position of panel part 100 corresponding with locking part 200 for preventing the rotation of panel part 100. Therefore, panel part 100 remains in the closed condition without rotation of the panel part 100 by using elastic pressing part 300 because locking part 200 formed as a hook makes contact with protrusion 110 of panel part 100.

Also, locking part 200 rotated during the opening time period of panel part 100 is returned to and original pre-rotated position due to the force of restoration of an elastic member 250 because one side of locking part 200 is connected with elastic member 250.

One side of panel part 100 is connected with a force converting member 410 for changing the rotary movement of panel part 100 to the rectilinear movement. An opposite side of force converting member 410 is connected with a sliding member 430 slid toward one of the forward and backward directions of main body 900 according to the movement of force converting member 410. The bottom face of sliding member 430 makes contact with a damping member 450 for reducing the sliding speed of sliding member 430. Slide member 430 and damping member 450 are fixed in a supporting member 470 installed in the inner part of main body 900.

Supporting member 470 comprises a plurality of guiding portions 433 horizontally installed in predetermined positions of side face thereof. Slide member 430 comprises a sliding rack 431 having a horizontally extended groove 435 being capable of connecting with guiding portions 433 to guide in the horizontal direction.

With respect to the operation of the panel opening and closing apparatus in accordance with the present invention, it will be described in the following description with reference to the drawings, FIGS. 2 to 4.

When the user wants to insert a tape into a car audio device, the user pushes a release knob. One side of locking part 200 is pressed toward the inner side of main body 900 and then is rotated. The other side of locking part 200 connected with protrusion 110 is upwardly pushed according to the rotation of one side of locking part 200 connected with main body 900. Thus, protrusion 110 becomes free from locking part 200.

Therefore, coil spring 310 pressed between an upper side of panel part 100 and main body 900 is free. Coil spring 310 presses the upper side of the back of panel part 100 by the force of restoration. Thus, panel part 100 rotates around rotating axis 130 by the force of restoration of coil spring 310 resulting in an opened condition. In turn, locking part 200 returns to an original pre-rotated position by elastic member 250 connected in the other side thereof.

One side of force converting member 410 connected with the side of panel part 100 starts to move according to the rotation of panel part 100. Sliding rack 431 connected with the opposite side of force converting member 410 moves from the inner part of main body 900 to the outside of the main body 900 according to the movement of force converting member 410.

Sliding rack 431 horizontally moves along with guiding portions 433 horizontally fixed at supporting member 470. Sliding rack 431 slides at low speed due to the speed reducing operation of damping member 450 in contact with the bottom face thereof. Also, panel part 100 is rotated at low speed according to the sliding of sliding rack 431 at low speed.

When panel part 100 finishes being rotated, a tape slot installed in main body 900 will appear in the rear of panel part 100.

The user inserts the tape into the tape slot. Next, panel part 100 is pushed toward main body 900.

Protrusion 110 of panel part 100 pushes up locking part 200 along with an inclined plane of locking part 200 installed in main body 900. If locking part 200 is backwardly pushed and protrusion 110 goes past locking part 200, locking part 200 connects with protrusion 110 by resiliently returning. Thus, panel part 100 is firmly fixed in main body 900.

With the panel opening and closing apparatus according to the present invention, because the locking part is connected with the protrusion formed in the panel part and the elastic pressing part for pressing the panel part toward the outside of the main body by using the force of restoration of the elastic member installed in the rear of the panel part, the panel part is automatically opened by the unlocking operation of the locking member and the hooked member and is closed by pushing and rotating the panel part so as to connect the locking part with the protrusion. Thus, it is possible to open and close the panel part by using this simple construction.

Also, with the panel opening and closing apparatus according to the present invention, the damping part causes a reduction in the rotating speed by the force converting member for changing the rotary movement of the panel part to the rectilinear movement, the sliding member slides in the horizontal direction according to the movement of the force converting member, and the damping member makes contact with the bottom face of the sliding member. Thus, the panel part softly opens, and noise generation is prevented during the panel opening and closing.

Also, the panel opening and closing apparatus according to the present invention protects the panel part against abrasion because of frequently opening and closing since the panel part is rotated at low speed when the damping member makes contact with the sliding member.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A panel opening and closing apparatus for inserting and ejecting an information recording medium comprising:

a panel part having a rotating axis protruding from a lower part of both sides of said panel part to be opened and closed by rotating said panel part, said panel part being connected by said rotating axis at a lower part of both sides of a main body for opening and closing an opening defined in a front side of said main body;

an opening and closing part installed in an inner part of said main body inwardly of said opening and having an elastic pressing part for turning said panel part on said rotating axis by pressing said panel part toward an outer direction outwardly of said opening of said main body and opening said panel part and a locking part for grasping said panel part to prevent said panel part from being rotated and opened by said elastic pressing part; and a damping part for rotating said panel part at low speed having a force converting member with one edge thereof connected with said panel part to change a rotary movement of said panel part into a rectilinear movement, a sliding member being capable of sliding toward said front side of said main body or an opposite direction thereof according to a movement of said force converting member, a damping member in contact with a bottom face of said sliding member for reducing a sliding speed of said sliding member, and a supporting member fixed at a bottom face of an inner part of said main body for supporting said damping member;

wherein said supporting member comprises a plurality of guiding portions horizontally installed in a predetermined position of a side face of said supporting member;

wherein said sliding member comprises a sliding rack having a groove horizontally extended and horizontally guiding said sliding member according to the movement of said force converting member by engaging with said guiding portions.

2. The panel opening and closing apparatus as claimed in claim 1, wherein said elastic pressing part is a coil spring having one side thereof fixed in the bottom side of said main body and the other side thereof fixed in an inner face of said panel part to press said panel part toward the outer direction of said main body.

3. The panel opening and closing apparatus as claimed in claim 1, wherein said locking part is formed as a hook for preventing a rotation of said panel part by said elastic pressing part and maintaining said panel part in the closed condition.

4. The panel opening and closing apparatus as claimed in claim 3, wherein said panel part comprises a protrusion formed in a position corresponding with said locking part for preventing rotation of said panel part by said elastic pressing part and maintaining said panel part in the closed condition by connecting said locking part with said protrusion of said panel part.

5. The panel opening and closing apparatus as claimed in claim 1, wherein said opening and closing part further comprises an elastic member connected with said locking part wherein said locking part returns to an original pre-rotated position by the force of restoration of said elastic member when said panel part is opened.

6. A panel opening and closing apparatus for inserting and ejecting an information recording medium comprising:

a panel part having a rotating axis protruding from a lower part of both sides of said panel part to be opened and closed by rotating said panel part, said panel part being connected by said rotating axis at a lower part of both sides of a main body for opening and closing an opening defined in a front side of said main body;

an opening and closing part installed in the inner part of said main body inwardly of said opening and having a coil spring having one side fixed in the bottom side of said main body and the other side fixed in an inner face of said panel part for turning said panel part on said rotating axis by pressing said panel part toward an outer direction outwardly of said opening, of said main body with the force of restoration so as to open said panel part, a locking part formed as a hook for grasping said panel part so as to prevent said panel part from being rotated and opened by said coil spring and to maintain said panel part in the closed condition, and an elastic member connected with said locking part, wherein said locking part returns to an original pre-rotated position by a force of restoration; and a damping part for rotating said panel part at low speed having a force converting member with one edge connected with said panel part to change a rotary movement of said panel part into a rectilinear movement, a sliding member in contact with an opposite edge of said force converting member and being capable of sliding in forward and backward directions towards and away from said opening respectively of said main body according to a movement of said force converting member, a damping member in contact with a bottom face of said sliding member for reducing a sliding speed of said sliding member, and a supporting member fixed at a bottom face of an inner part of said main body for supporting said sliding member and said damping member and having a plurality of guiding portions horizontally installed in predetermined positions of a side face of said supporting member; and wherein said sliding member comprises a sliding rack having a groove engaged with said protruded guiding portions so as to guide said sliding member in a horizontal direction according to the movement of said force converting member.

* * * * *